United States Patent

Immarco

[11] Patent Number: 6,006,185
[45] Date of Patent: Dec. 21, 1999

[54] SYSTEM AND DEVICE FOR ADVANCED VOICE RECOGNITION WORD SPOTTING

[76] Inventor: Peter Immarco, 5580 S. Pacific Blvd., Apt. #512, Boca Raton, Fla. 33433

[21] Appl. No.: 08/853,959

[22] Filed: May 9, 1997

[51] Int. Cl.[6] ................................. G10L 5/06; G10L 9/00
[52] U.S. Cl. .......................... 704/251; 704/254; 704/255
[58] Field of Search .................................... 704/251, 254, 704/252, 243, 255

[56] References Cited

U.S. PATENT DOCUMENTS

| | | | |
|---|---|---|---|
| 5,109,418 | 4/1992 | Van Hemert | 704/243 |
| 5,526,259 | 6/1996 | Kaji | 704/254 |
| 5,708,759 | 1/1998 | Kemeny | 704/254 |

*Primary Examiner*—David R. Hudspeth
*Assistant Examiner*—Robert Louis Sax
*Attorney, Agent, or Firm*—John C. Smith

[57] ABSTRACT

A speaker independent, continuous speech, word spotting voice recognition system and method. The edges of phonemes in an utterance are quickly and accurately isolated. The utterance is broken into wave segments based upon the edges of the phonemes. A voice recognition engine is consulted multiple times for several wave segments and the results are analyzed to correctly identify the words in the utterance.

20 Claims, 7 Drawing Sheets

SYSTEM AND DEVICE FOR ADVANCED VOICE RECOGNITION WORD SPOTTING

CROSS-REFERENCE TO RELATED APPLICATIONS

This application is related to commonly owned copending application entitled "SPEECH RECOGNITION DEVICES", filed May 8, 1997, bearing U.S. Ser. No.08/853,959 and naming Peter Immarco, Lawrence Cohen, and Theodore J. Gordon, the named inventors herein, as joint inventors, the contents of which is specifically incorporated by reference herein in its entirety, and commonly owned copending application entitled "SYSTEM AND DEVICE FOR IN-STORE PRODUCT LOCATOR", filed May 8, 1997, bearing U.S. Ser. 08/853,959 and naming Peter Immarco, Lawrence Cohen, and Theodore J. Gordon, the named inventors herein, as joint inventors, the contents of which is specifically incorporated by reference herein in its entirety.

BACKGROUND OF THE INVENTION

1. Technical Field

The present invention relates to voice recognition and in particular to speaker independent, continuous speech, word spotting voice recognition.

2. Background Art

Voice recognition engines analyze digitized speech files and return to their calling programs the resulting word or phrase. A digitized speech file contains a digital representation of an utterance. An utterance is a single body of speech spoken by a person. Such an utterance can be a word, a sentence, a paragraph, or an even larger body of speech.

Voice recognition engines which translate utterances can be classified by two characteristics: the plurality of speakers who can use the system and the type of speech that the system can accept. Voice recognition engines can be either speaker dependent or speaker independent. Speaker dependent engines require a voice recognition engine to be "trained" on a speaker's voice before the engines can recognize the speaker's speech. Speaker independent engines can recognize speech from any speaker without needing to be "trained" on the voices.

Voice recognition engines can also accept either continuous or discrete speech. Engines which use discrete speech require that the speaker pause between every word for at least 1/10th of a second. Continuous speech engines allow the speaker to talk at a normal rate of up to 200 words per minute. There are two ways for handling continuous speech, in the first an utterance is compared against a library of phrases and the phrase that is the closest to the utterance is returned. In the second, word spotting is used in which the speech recognition engine examines whole speech segments to identify any occurrences of the words the engine has been instructed to look for. The set of words the engine is looking for is known as the "Active Vocabulary." Word spotting is drastically harder to perform compared to the first method because the word or words to be identified have to be extracted from a messy seamless stream of phonemes regardless of: the placement of the words in the utterance, the order of the words, or the general shape or quality of the phonemes in the digitized speech file (such as due to the slurred or accented voice of the speaker).

Currently, voice recognition engines that perform speaker independent, continuous word spotting are limited to active vocabularies of 50 words or less. This means that these types of engines can look for, i.e. "spot", a maximum of 50 distinct words at the same time when analyzing an utterance. This limit of 50 words relegates continuous speech word spotting engines to carefully controlled, almost contrived, applications, such as spotting the digits 0 through 9 or word spotting an item from a small list of choices.

At this point, it is important to understand the difference between a resident vocabulary and the size of a word spotting voice recognition engine's active vocabulary. The resident vocabulary is the number of words that the word spotting voice recognition engine can have stored in memory and available for use when they are needed. However, the word spotting voice recognition engine is unable to look for all of those words at the same time. Therefore, only some of the words in the resident vocabulary are activated. The remaining vocabulary words remain inactive. The number of activated words is the number of words that a word spotting voice recognition engine can simultaneously look for in an utterance. If the speaker uses any words that have not been activated by the word spotting voice recognition engine, these words will not be recognized.

Speaker dependent, discrete speech voice recognition engines currently can have large active vocabularies that may contain many thousands of words, as opposed to continuous speech, word spotting systems. The primary disadvantage to such discrete speech systems is that these speech systems force the speaker to speak in a very unnatural, tiring manner. Except for a few limited cases of dictation, this makes them unusable for most commercial applications. A second disadvantage with such systems force the user to train the voice recognition engine on their voice for several hours and then require the user to pause between each word while speaking slowly. These systems can only accept such broken speech at a maximum rate of 100 words per minute. In a normal speaking situation, nobody pauses between every word and most people speak at rates between 120 and 200 words a minute.

Another disadvantage of such speaker dependent systems is that there are very few commercial applications that can afford the time it takes to train the engine on a speaker's voice. For example, asking the user of an automated teller machine to undergo a training session for an hour or two before using the system is completely unfeasible. In fact, anything short of no training time required is commercially useless. This is why the vast majority of possible applications of speech recognition have not been realized yet.

The prior art has failed to provide an advanced voice recognition system which accepts speaker independent, continuous speech utterances and can accurately perform word spotting on the utterances based upon an active vocabulary of thousands of words. Such a system must be able to respond to a user in real-time.

SUMMARY OF THE INVENTION

The present invention solves the foregoing problems by providing a system and device for speaker independent, continuous speech, word spotting voice recognition. The edges of phonemes in an utterance are quickly and accurately isolated. The utterance is broken into wave segments based upon the edges of the phonemes. A black-box speech recognition engine is consulted multiple times for several wave segments and the results are analyzed to correctly identify the words in the utterance.

DESCRIPTION OF THE PREFERRED EMBODIMENT

For ease of discussion, in the figures discussed below, elements having the same number perform essentially the same functions.

Figure 1:
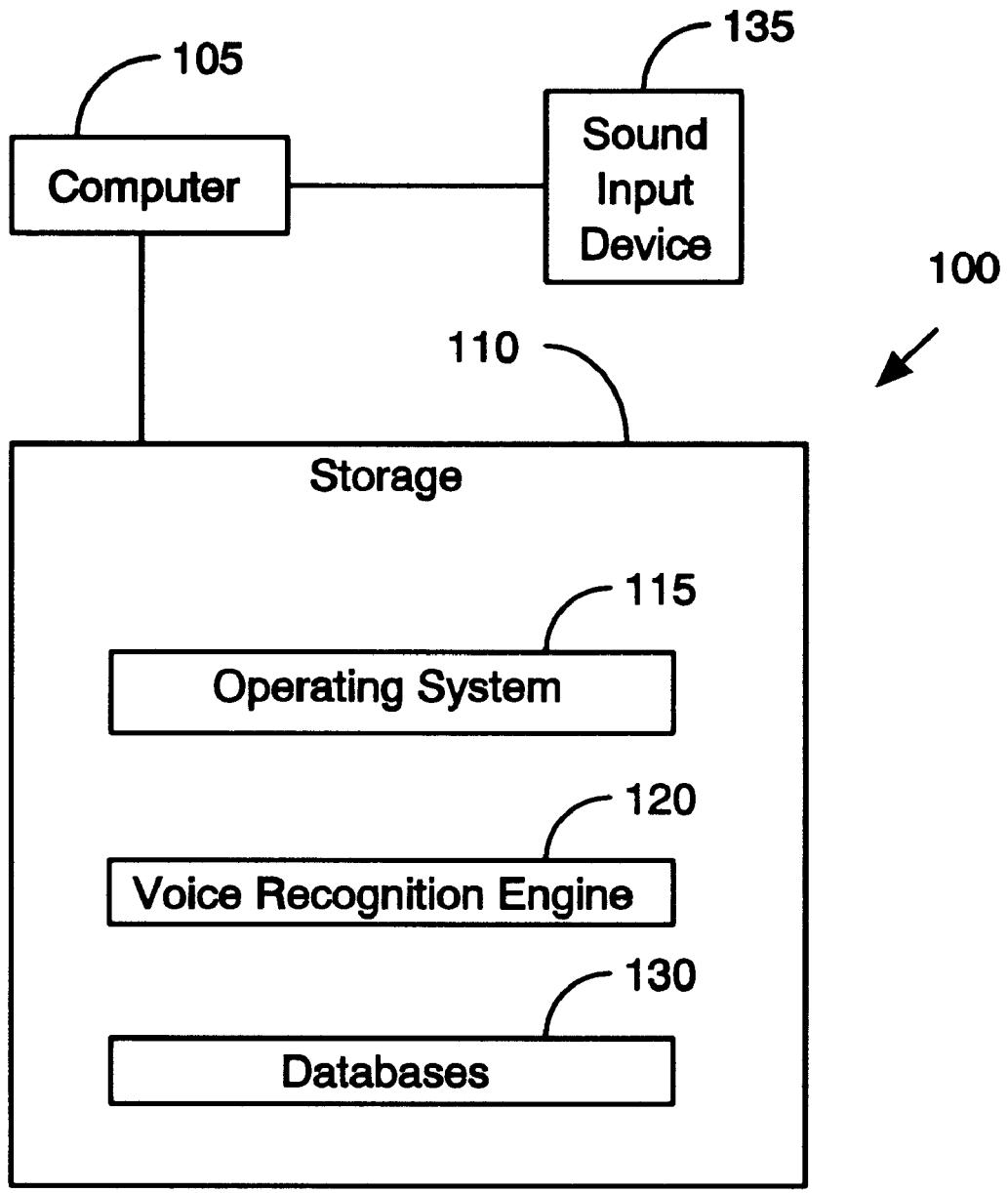
FIG. 1 is a block diagram of a traditional word spotting voice recognition system.

FIG. 1 is a block diagram of a traditional word spotting voice recognition system. Referring to FIG. 1, the traditional word spotting voice recognition system 100 consists of a computer 105 having storage 110 and sound input device 135. Computer 105 can be any general purpose computer, including a IBM-compatible personal computer. Storage 110 can consist of RAM, ROM, disk drives, CD-ROM or other computer media. Storage 110 contains an operating system 115, voice recognition engine 120 and databases 130. Sound input device 135 can be a microphone. Traditional word spotting voice recognition system 100 works by a user speaking an utterance into sound input device 135. Computer 105 either writes the resulting digitized speech to storage 110 for later use, or passes it directly into voice recognition engine 120. Voice recognition engine 120 uses statistical methods to determine a best guess of the utterance based upon voice recognition engine 120's active vocabulary from databases 130.

Figure 2:
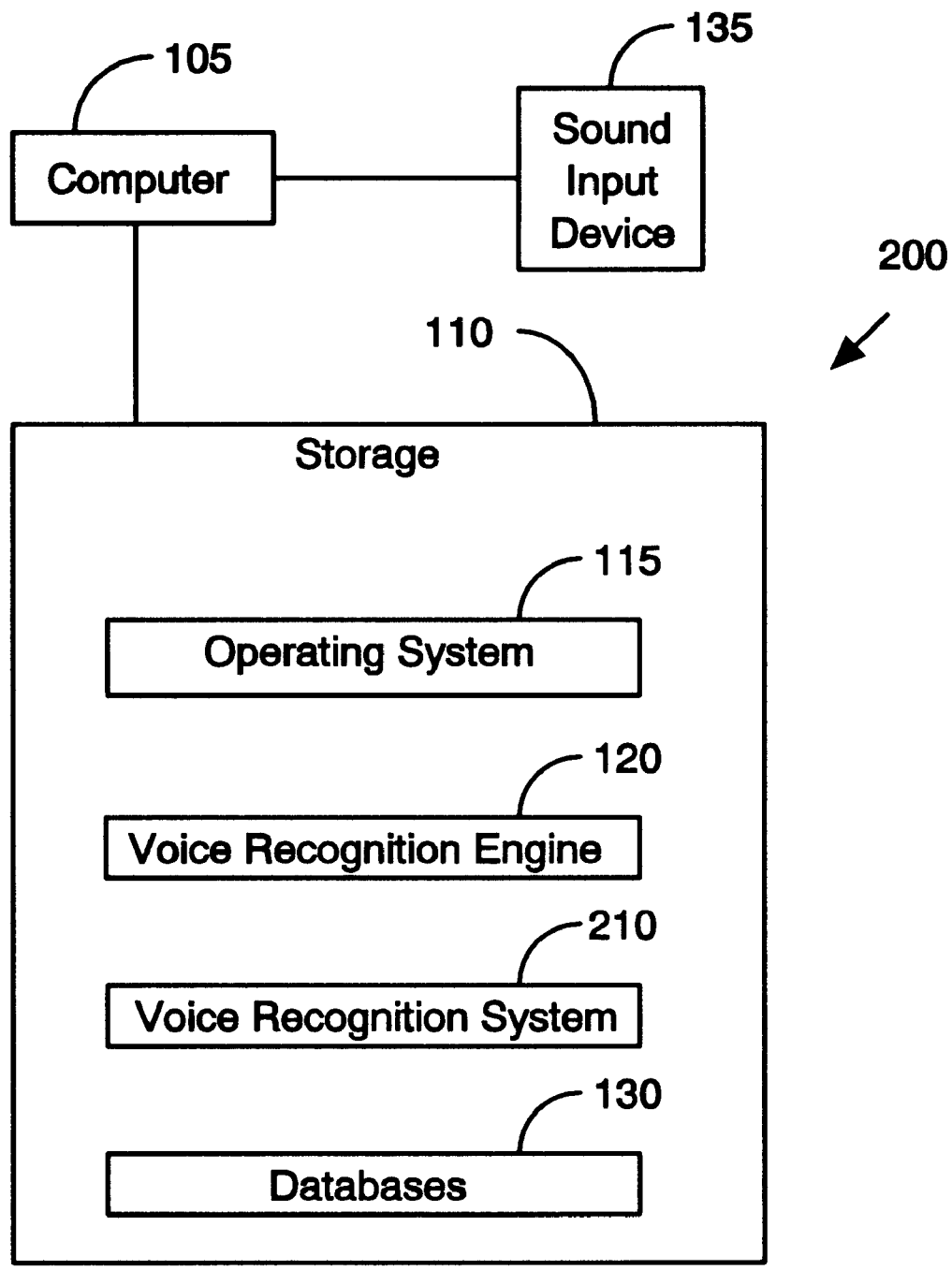
FIG. 2 is a block diagram of the present invention, an advanced word spotting voice recognition meta-system.

FIG. 2 is a block diagram of the present invention, an advanced word spotting voice recognition meta-system 200. FIG. 2 adds to FIG. 1's elements. Here, storage 110 also contains voice recognition meta-system 210. Voice recognition meta-system 210 pre-processes the utterances before sending them in multiple forms to voice recognition engine 120. Then, the results from voice recognition engine 120 are further processed by voice recognition meta-system 210 to more accurately determine the text from an utterance based upon voice recognition meta-system 210's robust active vocabulary. The pre- and post-processing of voice recognition meta-system 210 includes word spotting using a tri-window difference minimization technique, a phoneme edge technique, and a wave segment technique. Processing also includes the use of a rulebase to determine the best prediction of the text from an utterance.

Figure 3:
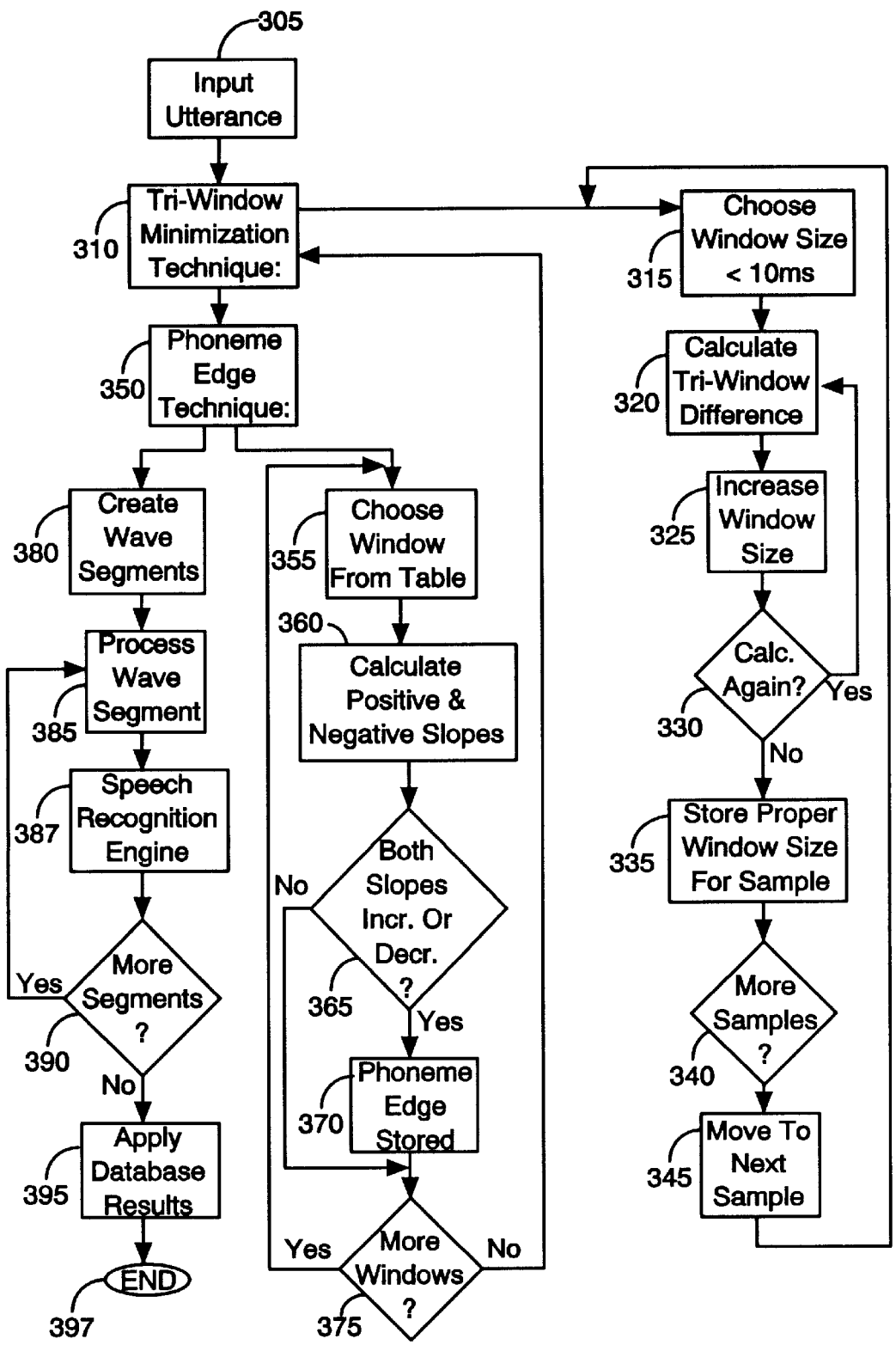
FIG. 3 is a flow chart of the processes done by advanced word spotting voice recognition meta-system.

FIG. 3 is a flow chart of the procedure of voice recognition using the present invention's advanced voice recognition meta-system 210. At step 305, an utterance is retrieved. Utterance can be retrieved as a pre-stored digitized voice file in storage 110 or can be captured in real-time from sound input device 135.

In discrete speech voice recognition, the speaker must pause between each word in an utterance. This allows the system to determine the beginning and ending of each word. Separating words is not so easily done in a continuous speech, word spotting system. An utterance in continuous speech consists of many phonemes, the building blocks of spoken words. Each phoneme changes seamlessly into the next phoneme. This morphing, such as the gradual change between the "m" sound and the "e" sound in the word "me", makes separating words in an utterance especially difficult. The best results are achieved in such a system when an entire word (from the start of the first phoneme in that word) is sent to voice recognition engine 120 for analysis.

So, starting at step 310, the utterance is separated into segments. Each segment will attempt to consist of a series of entire phonemes and will be later passed to voice recognition engine 120 for analysis. To correctly break apart the utterance into segments, at steps 310 through 345, the tri-window difference minimization technique is used by voice recognition system 210 to determine the most probable "windows" of time that indicate a change from one phoneme to the next.

Tri-Window Difference Minimization

The Tri-Window Difference Minimization technique is used to create a table of sampling intervals that will be used when finding the edges of phonemes within the digitized speech file. Three windows are used because it is more robust than two windows in capturing the best window length near a phoneme edge. A two window system could easily be confused by an amplitude rather than a frequency change, and it is a frequency change that denotes the edge of a phoneme. More than three windows is unnecessary and does not provide any increase in the accuracy of the technique.

Figure 4A:
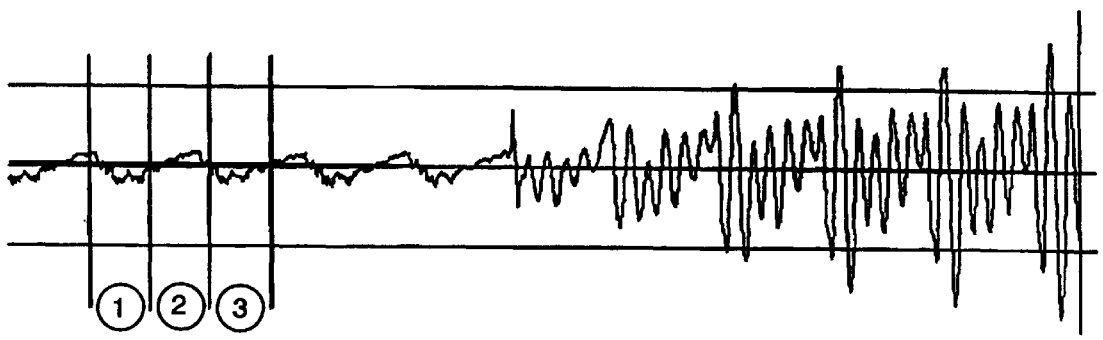
FIG. 4A is a graphical display of a digitized utterance showing windows too small.

FIG. 4A shows a fragment of an utterance. This fragment is a graphic display of the consonant "m" morphing into the long "e" vowel sound, which occurs when a speaker says "me". To find the best window length, the utterance's samples are processed sequentially from the beginning to the end of the digitized speech file. The best window length is the one that captures exactly one peak-to-peak cycle of the baseline frequency of the speaker's voice. This gives the technique a higher signal-to-noise ratio than other techniques because it will realign itself quickly with the undamaged portion(s) of the digitized speech file. Damaging noise in a digitized speech file can be anything from a sampling aliasing error to a pop or spike. For the same reason this technique is better at finding the edges of sibilance phonemes (e.g. "s", "k", "t", etc.) which have a high white noise content. First a test window length is used which is guaranteed to be too small. Since human speech changes frequencies roughly every 10 milliseconds, something substantially smaller than 10 milliseconds is used. Three equisized windows are created using this size of window length at step 315. Referring again to FIG. 4A, vertical lines separate the three windows at a distance of less than 10 milliseconds. This window length is too small because each window fails to contain a single cycle of sound.

Figure 5:
FIG. 5 is the formula for the tri-window difference.
Figure 5:
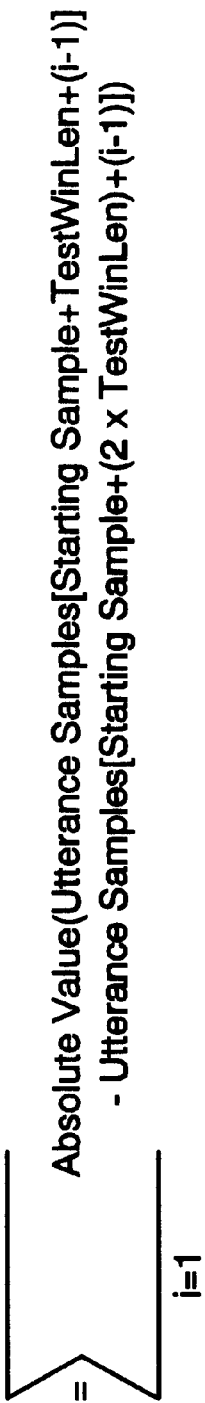

Once the windows are placed, at step 320, the tri-window difference is calculated using the formula shown in FIG. 5. In the formula of FIG. 5, "TestWinLen" is the sampling interval size for the three windows. "Starting Sample" is the ordinal sample number, i.e. location within the utterance, belonging to the sample at which the measurement is being taken. "Utterance Samples" is an array containing all the samples for the utterance.

Figure 4B:
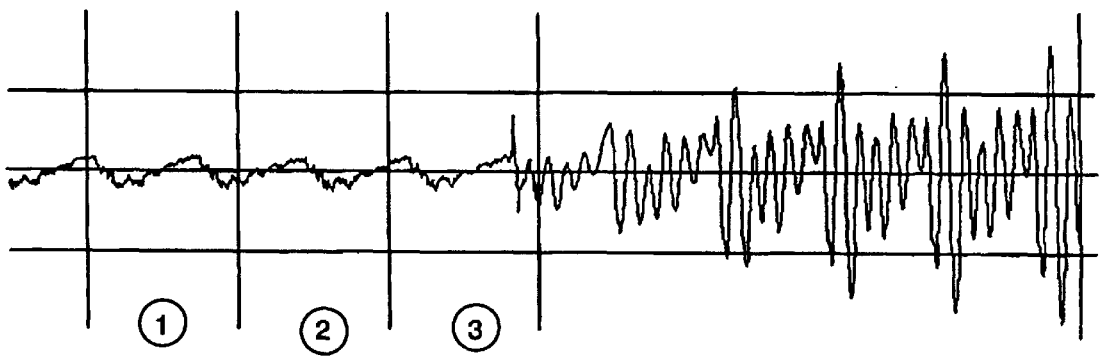
FIG. 4B is a graphical display of a digitized utterance showing windows too large.
Figure 4C:
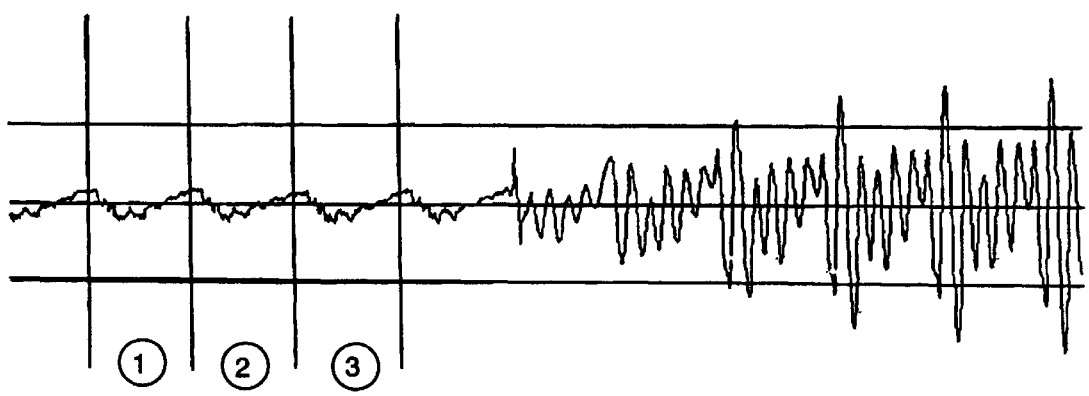
FIG. 4C is a graphical display of a digitized utterance showing windows of proper size.

The simplicity of this formula allows it to be rapidly executed. This calculation is repeated for successively larger window lengths, at steps 325 and 330, until a window length substantially larger than 10 milliseconds, as is shown in FIG. 4B, is tried. The window length from these repetitions that results in the smallest tri-window difference is the preferred window size. FIG. 5C shows the correct window length. Referring to FIG. 4C, this window length results in a window that is a very "tight fit" around the cyclical qualities of the utterance.

Figure 6A:
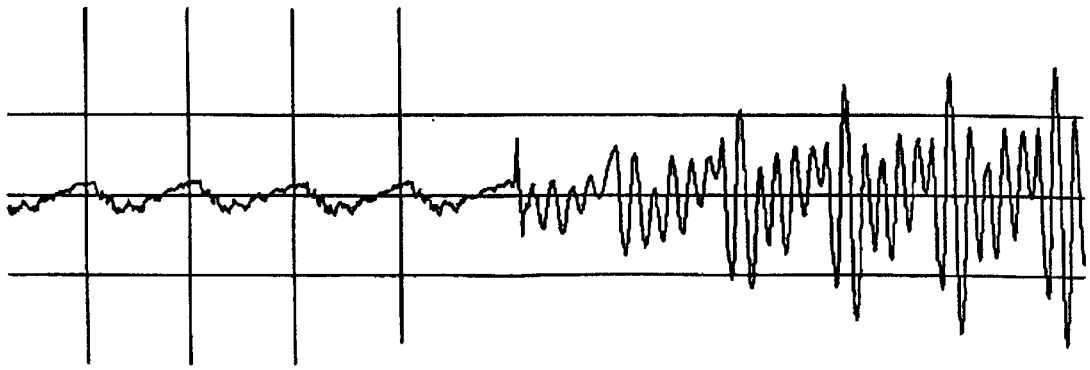
FIGS. 6A, 6B and 6C show the method of moving through the samples of the utterance.
Figure 6B:
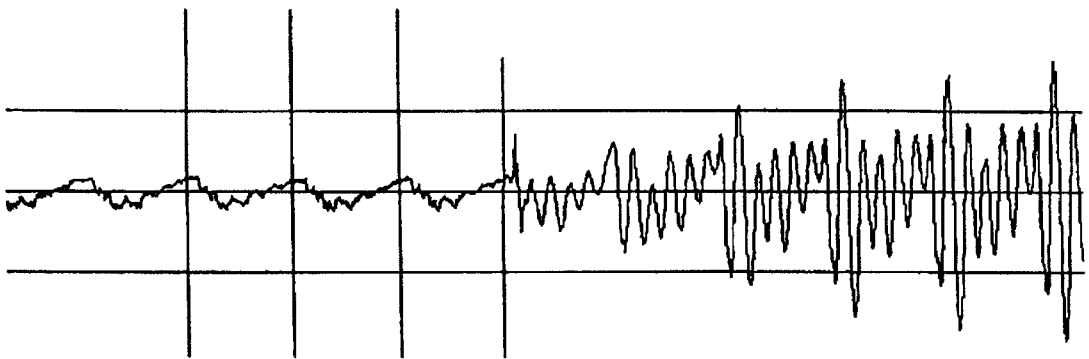
Figure 6C:
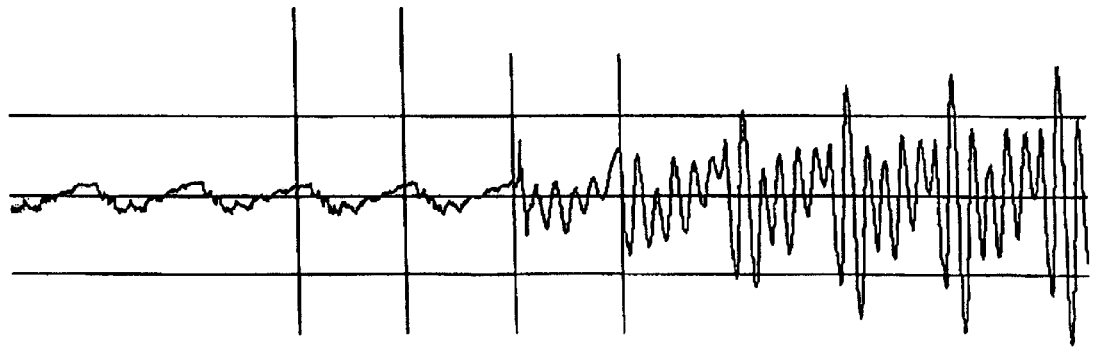

At step 335, a table is created associating the best window length to the location (sample number) in the utterance. For the next sample in the utterance, at steps 340 and 345, the sliding window is jumped ahead by the size of the best window length just calculated so that the tri-window minimization formula can be applied again. FIGS. 6A, 6B and 6C show the method of moving through the samples of the utterance by steps 340 and 345. This technique of moving ahead one full window length at a time per sample is drastic improvement, typically 100 to 1, in processing type over the standard technique. This quicker method is reliable because human speech does not change pitch radically over time. Because speech is produced by vocal cords having to stretch from one pitch to the next pitch, the morphing between pitches is gradual and there is thus no chance of missing an important change in the frequency by jumping one entire window length, rather than inching slowly along.

Once all samples have been processed, the resulting table from step 335 of the best window length at the various locations in the utterance might look, in part, like:

| Sample Location | Best Window Length |
|---|---|
| 1 | 114 |
| 115 | 113 |
| 218 | 112 |
| 330 | 110 |
| . | . |
| . | . |
| . | . |

This table indicates that the first window begins at sample 1 of the utterance and has a window length of 114. The next sample tested begins immediately after this window (1+114), which is sample 115 and has a best window length of 113. The third sample tested begins after the second window (115+113), which is sample 218 and has a best window length of 112. This decrease in window lengths indicates an increase in frequency.

Phoneme Edge Technique

After the windows have been calculated, steps 350 through 375, process the utterance again. This time, the utterance is searched for phoneme edges. Such edges mark the transition of a new phoneme in the utterance. A phoneme edge is indicated in a digitized voice waveform by simultaneous increase or decrease in the slopes of the waveform's positive and negative sample energies. If only either the positive or negative energy is increasing or decreasing, or if either the negative or positive sample energy slopes are zero, then a phoneme edge is not found.

Figure 7A:
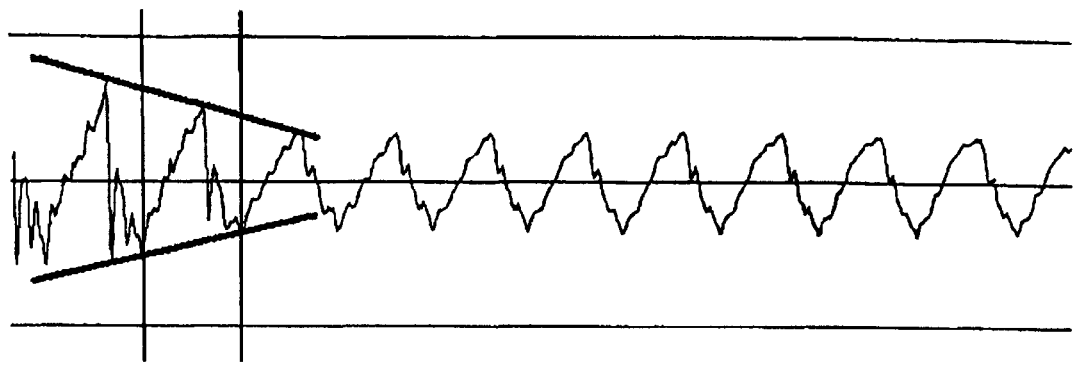
FIGS. 7A and 7B are graphical displays of a digitized utterance showing a phoneme edge within a sample interval window.
Figure 7B:
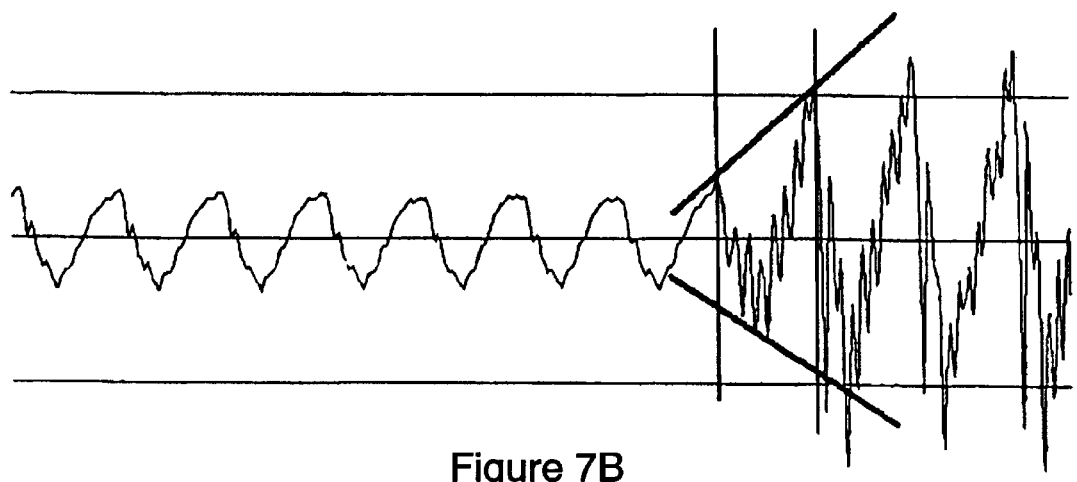

FIGS. 7A and 7B show two phoneme edges within a sample's window. FIG. 7A has its positive and negative energy slopes simultaneously decreasing. FIG. 7B's slopes are simultaneously increasing.

Referring back to FIG. 3's phoneme edge steps 350 through 375, at step 355, the first window location is found in the previously stored table. At step 360, the slopes of the positive and negative energy in the waveform's window are calculated. Then at steps 365 and 370, if both the slopes are increasing or both are decreasing, a phoneme edge has been detected and its position is stored in a table. This is repeated for each window in the utterance and a resulting phoneme edge table might look like:

| Location of Phoneme Edge |
|---|
| 320 |
| 450 |
| 575 |
| 850 |
| 928 |
| 1002 |
| . |
| . |
| . |

This table indicates that phoneme edges were found to be within the windows at locations 320, 450, 575, etc.

Wave Segments

Once the table of phoneme edges is complete, wave segments can be individually used. A wave segment is a piece of the utterance beginning at a phoneme edge and ending at one of the later phoneme edges. These wave segments are candidates for being words. At steps 380 and 385, a set of wave segments are assembled and processed using the table of phoneme edges previously created. Even though there is usually a relatively small number of phoneme edges, for speed purposes, it is advantageous to be selective in which wave segments to assemble. Heuristics are used to reduce the number of phoneme edge marker combinations to a manageable level.

For example, speech recognition might be implemented for database query operations. In this type of application, the critical word nearly always occurs at the end of the utterance. Examples of such queries are: "Do you know where the milk is?", "Tell me what my balance is.", or "Where is the shoe department?" The critical words "milk," "balance," and "shoe department" all occur at the end of the utterances. Therefore, heuristics might discard potential wave segments occurring at the beginning of the utterance. Of course, in other languages, such as Japanese, just the opposite might be true and thus heuristics might place a greater emphasis on the start of the utterance. The heuristics might also only form wave segments consisting of three phonemes (being separated by three phoneme edge markers). Single- or dual-phoneme wave segments might then be discarded.

For example, if the utterance is the command "Find the metal," the phoneme edge markers and heuristics might determine the seven wave segments to be:

| Wave Segment |
|---|
| "Find" |
| "Find th" |
| "nd the me" |
| "the" |
| "the m" |
| "e metal" |
| "metal". |

Once the wave segments have been constructed and processed, they are all sent to speech recognition engine 120 for evaluation. Speech recognition engine 120 can be any of a number of commercially available products. In the preceding example of the utterance "Find the metal,", the results from speech recognition engine 120 could be:

| Wave Segment | Resulting Text | Resulting Error ? |
| --- | --- | --- |
| "Find" | Find | No |
| "Find th" | Find | Yes |
| "nd the me" | Enemy | Yes |
| "the" | The | No |
| "the m" | The | Yes |
| "e metal" | <no result> | Yes |
| "metal" | Metal | No |

The text and error results from speech recognition engine 120's evaluation can be processed, at step 395, by a Rulebase. This Rulebase can be a set of rules in an expert system, a neural net trained on analyzing such results, a set of fuzzy logic rules, a set of context analyses, or any other decision support system. In doing so, Rulebase can render one of three high-level decisions:

Case 1: Is there one clear overwhelming winner?

Case 2: Are there multiple similar competing winners that should be returned?

Case 3: Are there no useful winners at all?

By returning one of these three cases instead of a single item of recognized text along with it's recognition flags, the calling program can perform several important functions, functions that are nearly impossible to perform properly with a singular recognition result. In Case 1 the single choice would be returned to the calling program and the calling program would simply proceed with the singular result. In Case 2 the calling program could display or read (with a speech synthesis program) the list of competing winners and ask the user to choose one. In Case 3, the user could be asked to speak louder or more clearly, or to attempt a different word or phrasing. This adds a very powerful human like capability to the speech recognition application because this is the method we use with each other to receive or clarify utterances we hear.

Recognition results that have error flags set could have less weight in the Rulebase's judging process than those that do not. If speech recognition engine 120 supports multiple recognition flags certain flags could deem a wave segment's recognized text to be less reliable than those that don't have those flags or combination of flags set. Referring to the "Find the metal" example, discarding results having errors leaves just the proper three results "Find," "the," and "metal."

If all of the recognition scores across all of the wave segments is below a certain threshold then the Case 3 "No Useful Winners" result would be returned to the calling program. If there were several wave segments that scored highly but all of the scores were relatively close to each other, then the Case 2 "Several Competing Winners" result would be returned to the calling program with the text for the competing winners returned in a list. For example, the user might have mumbled "Where's the flower?" resulting in two competing winners: "Where's the flour?" and "Where's the flower?". Of course, if it was a floral shop application there might be a rule selecting the "Where's the flower?" choice as the winner in the final analysis rulebase in step 395.

As can be understood by this detailed discussion, the present invention is a meta-system which surrounds a speaker independent, voice recognition engine. This meta-system provides a high-level abstraction of the utterance. The meta-system achieves its remarkable word spotting ability by utilizing a voice recognition engine, in a black-box fashion, to find the results from intelligently isolated wave segments. The multiple consultations with the voice recognition engine by the meta-system are diagnosed by the Rulebase to provide highly accurate word spotting capabilities.

Other embodiments of the present invention are possible without departing from the scope and spirit of the present invention. Other embodiments of this invention include implementing the voice recognition system in an information kiosk at a store. Or, the system could be implemented in a portable unit to be used for on-the-spot translation of speech into a second language. Because of the speed and ability of the voice recognition system, it can be incorporated into numerous currently non-voice activated devices, such as a car's driver control system, software applications such as a word processor, and programmable VCRs and televisions. Any product which currently includes a microprocessor control is a candidate for this voice recognition system.

While the invention has been described with respect to a preferred embodiment thereof it will be understood by those skilled in the art that various changes in detail may be made therein without departing from the spirit, scope, and teaching of the invention. Accordingly, the invention herein disclosed is to be limited only as specified in the following claims.

We claim:

1. A speech recognition system that pre-processes speech data and inputs the pre-processed speech data in several forms to a voice recognition engine for determination of the most likely spoken word, comprising:

audio input means to input audio data comprised of phonemes;

phoneme identification means to detect individual phonemes;

wave segment grouping means to group phonemes into wave segments;

a wave segment pre-processor to select groups of wave segments having at least one wave segment and output the selected wave segment groups to a speech recognition engine; and a speech recognition engine having means to compare wave segments groups output by the wave segment pre-processor with a predetermined list of words;

means to determine which wave segment groups match entries in the predetermined list of words;

whereby wave segments are pre-processed into wave segment groups and analyzed to determine which of the wave segment groups most likely represent words that are input to the speech recognition engine.

2. A system, as in claim 1, wherein the phoneme identification means further comprises:

means to select a portion of the input audio data with a first preselected sampling window length, the first preselected sampling window length having a length less than a phoneme;

means to select a portion of the input audio data with a second preselected sampling window length, the second preselected sampling window length having a length greater than the first sampling window;

means to select a portion of the input audio data with a third preselected sampling window length, the third preselected sampling window having a length greater than the second sampling window length;

means to analyze the audio data using each sampling window length to determine which sampling window length most closely approximates a complete phoneme cycle and selecting the sampling window length that most closely approximates a complete phoneme cycle; and means to analyze the audio data using the selected sampling window length to select individual phonemes by advancing through the input audio data from a first detected phoneme to a subsequent phoneme by advancing a window length;

whereby the audio data can be more rapidly analyzed by stepping through the input data using the sampling window length.

3. A system, as in claim 2, further comprising means to select the sampling window length that most closely approximates the phoneme length by detecting a change in pitch, the change in pitch determined by selecting the sampling window length that results in the lowest difference value when two adjacent windows are subtracted from one another.

4. A system, as in claim 2, wherein:

the first preselected sampling window is less than ten milliseconds; and at least one of the second and third preselected sampling windows is greater than ten milliseconds.

5. A system, as in claim 4, further comprising means to select the sampling window length that most closely approximates the phoneme length by selecting the sampling window length that results in the lowest difference value when two adjacent windows are subtracted from one another.

6. A system, as in claim 1, wherein the wave segment pre-processor further comprises:

a table of valid wave segments;

means to compare the wave segments with the table of valid wave segments; and means to output to the speech recognition engine wave segments which correspond to wave segments that are stored in the table of valid wave segments.

7. A system, as in claim 6, wherein the phoneme identification means further comprises:

means to select a portion of the input audio data with a first preselected sampling window, the first preselected sampling window having a length less than a phoneme;

means to select a portion of the input audio data with a second preselected sampling window, the second preselected sampling window having a length greater than the first sampling window;

means to select a portion of the input audio data with a third preselected sampling window, the third preselected sampling window having a length greater than the second sampling window;

means to examine the audio data in each sampling window to determine which sampling window most closely approximates a complete phoneme cycle and selecting the sampling window length of the sampling window that most closely approximates a complete phoneme cycle; and means to examine the audio data using the selected sampling window length to select individual phonemes by advancing through the input audio data from a first detected phoneme to a subsequent phoneme by advancing a window length;

whereby the audio data can be more rapidly analyzed by stepping through the input data using the sampling window length.

8. A system, as in claim 7, further comprising means to select the sampling window length that most closely approximates the phoneme length by detecting a change in pitch, the change in pitch determined by selecting the sampling window length that results in the lowest difference value when two adjacent windows are subtracted from one another.

9. A system, as in claim 7, wherein:

the first preselected sampling window is less than ten milliseconds; and at least one of the second and third preselected sampling windows is greater than ten milliseconds.

10. A system, as in claim 9, further comprising means to select the sampling window length that most closely approximates the phoneme length by selecting the sampling window length that results in the lowest difference value when two adjacent windows are subtracted from one another.

11. A method of recognizing continuous speech voice input with a computer, including the steps of:

inputting audio data comprised of phonemes;

identifying individual phonemes;

grouping phonemes into wave segments;

selecting groups of wave segments that each contain at least one wave segment with a wave segment pre-processor by first comparing the wave segments with a table of preselected valid words and then only outputting those wave segment groups which correspond to wave segments that are stored in a table of valid words to a speech recognition engine;

whereby wave segments are pre-processed into wave segment groups and analyzed to determine which of the wave segment groups most likely represent words that are input to the speech recognition engine.

12. A method, as in claim 11, including the further steps of:

selecting a portion of the input audio data with a first preselected sampling window, the first preselected sampling window having a length less than a phoneme;

selecting a portion of the input audio data with a second preselected sampling window, the second preselected sampling window having a length greater than the first sampling window;

selecting a portion of the input audio data with a third preselected sampling window, the third preselected sampling window having a length greater than the second sampling window;

examining the audio data in each sampling window to determine which sampling window most closely approximates a complete phoneme cycle and selecting the sampling window length of the sampling window that most closely approximates a complete phoneme cycle; and advancing through the audio data using the selected sampling window length to select the subsequent phonemes.

13. A method, as in claim 12, including the further steps of selecting the sampling window length that most closely approximates the phoneme length by detecting a change in pitch, the change in pitch determined by selecting the sampling window length that results in the lowest difference value when two adjacent windows are subtracted from one another.

14. A method, as in claim 12, including the further steps of:

setting the first preselected sampling window to a value less than ten milliseconds; and setting at least one of the second and third preselected sampling windows is greater than ten milliseconds.

15. A method, as in claim 14, including the further steps of selecting the sampling window length that most closely approximates the phoneme length by selecting the sampling window length that results in the lowest difference value when two adjacent windows are subtracted from one another.

16. A method of word spotting in a speech recognition system, including the steps of:

identifying groups of phonemes which represent possible valid words;

comparing the possible valid words with a preselected list of valid words;

selecting words which correspond to an entry in the list of valid words; and outputting the selected words to a speech recognition engine;

whereby groups of phonemes are pre-processed such that only selected groups of phonemes are input to the voice recognition engine.

17. A method, as in claim 16, including the further steps of:

identifying groups of phonemes which represent possible valid words by;
      identifying individual phonemes; and
      grouping phonemes into wave segments;
      selecting wave segments with a wave segment pre-processor;
      comparing the wave segments with a table of preselected valid wave segments;
      outputting wave segments which correspond to wave segments that are stored in the table of valid wave segments as selected words; and
   whereby only wave segments that match pre-selected wave segments are input to the speech recognition engine.

18. A method, as in claim 17, including the further steps of:

identifying phonemes by selecting a portion of the input audio data with a first preselected sampling window, the first preselected sampling window having a length less than a phoneme;

selecting a portion of the input audio data with a second preselected sampling window, the second preselected sampling window having a length greater than the first sampling window;

selecting a portion of the input audio data with a third preselected sampling window, the third preselected sampling window having a length greater than the second sampling window;

examining the audio data in each sampling window to determine which sampling window most closely approximates a complete phoneme cycle and selecting the sampling window length of the sampling window that most closely approximates a complete phoneme cycle; and advancing through the audio data using the selected sampling window length to select subsequent phonemes.

19. A method, as in claim 18, including the additional steps of:

examining each sampling window to determine the signal to noise ratio for that sampling window;

calculating the difference in signal to noise ratio between adjacent sampling windows; and selecting the sampling window that most closely approximates the phoneme length by selecting the sampling window length that results in the lowest signal to noise ratio.

20. A method of using rules based responses in a speech recognition system, including the steps of:

inputting audio data from a user into a computer;

identifying a keyword in the data input by the user;

comparing the keyword with a list of valid words in a database;

selecting the keyword when the keyword corresponds to only a valid word in the database;

entering the selected keyword to a speech recognition engine only when the keyword matches an entry in the list of valid words;

querying the user with a list of choices when the keyword corresponds to more than one valid word in the database;

querying the user to reenter the audio data when the keyword does not correspond to a valid word in the database.

* * * * *